(12) United States Patent
Murota (10) Patent No.: US 10,974,357 B2
(45) Date of Patent: Apr. 13, 2021

(54) SPINDLE DEVICE (71) Applicant: FANUC CORPORATION, Yamanashi (JP)

(72) Inventor: Masahiro Murota, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/666,482

(22) Filed: Oct. 29, 2019

(65) Prior Publication Data

US 2020/0130122 A1 Apr. 30, 2020

(30) Foreign Application Priority Data

Oct. 31, 2018 (JP) .............................. JP2018-205246

(51) Int. Cl.
| | | |
|---|---|---|
| B23Q 5/10 | (2006.01) | |
| B23Q 1/70 | (2006.01) | |
| B23Q 3/08 | (2006.01) | |
| B23Q 11/12 | (2006.01) | |

(52) U.S. Cl.
CPC .................. B23Q 5/10 (2013.01); *B23Q 1/70* (2013.01); *B23Q 3/08* (2013.01); *B23Q 11/127* (2013.01)

(58) Field of Classification Search
CPC . B23Q 3/08; B23Q 3/088; B23Q 5/06; B23Q 5/08; B23Q 5/261; B23B 31/001; B23B 31/30; B23B 31/10; B23B 31/302; B23B 31/307; Y10T 279/11; H01L 21/6838
See application file for complete search history.

(56) References Cited

U.S. PATENT DOCUMENTS

| | | | | | |
|---|---|---|---|---|---|
| 5,749,999 | A | * | 5/1998 | Dandia | ............... H01L 21/6715 156/285 |
| 5,928,537 | A | * | 7/1999 | Fortune | .............. H05K 13/0447 219/228 |
| 6,102,788 | A | * | 8/2000 | Uto | ..................... H01L 21/6838 451/288 |
| 2015/0325466 | A1 | * | 11/2015 | Wang | .................. H01L 21/6875 279/3 |

FOREIGN PATENT DOCUMENTS

| | | |
|---|---|---|
| JP | H01101702 U | 7/1989 |
| JP | H04129632 A | 4/1992 |
| JP | H06075635 U | 10/1994 |
| JP | 201442945 A | 3/2014 |

(Continued)

OTHER PUBLICATIONS

Machine Translation of IDS provided reference JP 2014-42945 A, pp. 5-11 (Year: 2020).*

(Continued)

*Primary Examiner* — Nicole N Ramos
(74) *Attorney, Agent, or Firm* — Fredrikson & Byron, P.A.

(57) ABSTRACT

A chuck unit as a rotating member of a spindle device includes a base portion fixed to one end of the spindle shaft, an attaching portion detachably attached to a side of the base portion that is located on an opposite side of the base portion from the one end of the spindle shaft, and an accommodation space arranged on a communication passage so as to accommodate a filter.

4 Claims, 7 Drawing Sheets

(56) References Cited

FOREIGN PATENT DOCUMENTS

JP        2014046431 A     3/2014

OTHER PUBLICATIONS

English Abstract and Machine Translation for Japanese Publication No. 2014-042945 A, published Mar. 13, 2014, 7 pgs.
Partial English Machine Translation for Japanese Publication No. JPH01-101702U, published Jul. 10, 1989, and English Machine Translation for Japanese Publication No. JPH06-030326Y2, published Aug. 17, 1994, 9 pgs.
English Abstract and Machine Translation for Japanese Publication No. JPH04-129632A, published Apr. 30, 1992, 5 pgs.
English Abstract and Machine Translation for Japanese Publication No. JPH06-075635U, published Oct. 25, 1994, 8 pgs.
English Abstract and Machine Translation for Japanese Publication No. JP2014-046431A, published Mar. 17, 2014, 14 pgs.

* cited by examiner

SPINDLE DEVICE

CROSS-REFERENCE TO RELATED APPLICATION

This application is based upon and claims the benefit of priority from Japanese Patent Application No. 2018-205246 filed on Oct. 31, 2018, the contents of which are incorporated herein by reference.

BACKGROUND OF THE INVENTION

Field of the Invention

The present invention relates to a spindle device used in a lathe (machine tool) that machines a workpiece using a tool.

Description of the Related Art

There are spindle devices that machine a workpiece by turning the spindle shaft while holding the workpiece at one end of the spindle shaft by means of a vacuum chuck mechanism. Japanese Laid-Open Patent Publication No. 2014-042945 discloses a workpiece holding device as such a spindle device.

In the workpiece holding device disclosed in Japanese Laid-Open Patent Publication No. 2014-042945, a vacuum chuck mechanism is disposed on one end side of a rotary shaft while a rotary joint for connecting an air suction circuit and the rotary shaft is disposed on the other end side of the rotary shaft. This rotary joint has a noncontact sealing structure that creates sealing between itself and the outer peripheral surface of the rotary shaft when the air suction circuit is driven to draw the air from the outside into the flow path inside the spindle shaft through the vacuum chuck mechanism. Thus, in this configuration, sealing can be done without use of a physical seal member.

SUMMARY OF THE INVENTION

Since the air drawn from the outside into the flow path inside the spindle shaft via the vacuum chuck mechanism may contain dust such as chips generated during machining of workpieces, there have been proposed spindle devices that have a filter arranged in the spindle shaft for the purpose of removing the dust.

However, in the workpiece holding device of Japanese Laid-Open Patent Publication No. 2014-042945, when the filter disposed in the spindle shaft is taken out in a maintenance operation or an inspection operation, it is necessary to disassemble the rotary joint. However, if this rotary joint is disassembled, the bearings become directly exposed to the outside without being shaded or protected by any sealing partition. To avoid this, the operator is strongly required to give careful attention to such maintenance and inspection operations so that dust may not enter the bearings. Accordingly, there is a demand for simplification of maintenance and inspection operations.

It is therefore an object of the present invention to provide a spindle device that can simplify maintenance and inspection operations.

An aspect of the invention resides in a spindle device, which includes: a spindle housing; a spindle shaft having, formed therein, a suction passage configured to flow air suctioned from the outside, the spindle shaft being configured to be rotatably supported inside the spindle housing; and a rotating member having, formed therein, a communication passage configured to establish communication between the suction passage and the outside, the rotating member being provided at one end of the spindle housing so as to be rotatable in linkage with rotation of the spindle shaft. The rotating member includes a base portion fixed to one end of the spindle shaft, an attaching portion detachably attached to a side of the base portion that is located on an opposite side of the base portion from the one end of the spindle shaft, and an accommodation space arranged on the communication passage so as to accommodate a filter.

In the present invention, the attaching portion can be removed from the base portion so as to expose the accommodation space for the filter while the seal gas is being supplied to the gap between the base portion and the spindle housing. As a result, the filter can be replaced while dust is prevented from flowing into the bearings and others inside the spindle housing through the gap between the base portion and the spindle housing. Thus, according to the present invention, it is possible to simplify maintenance and inspection operations.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing a preferred embodiment with reference to the accompanying drawings.

Embodiment

Figure 1:
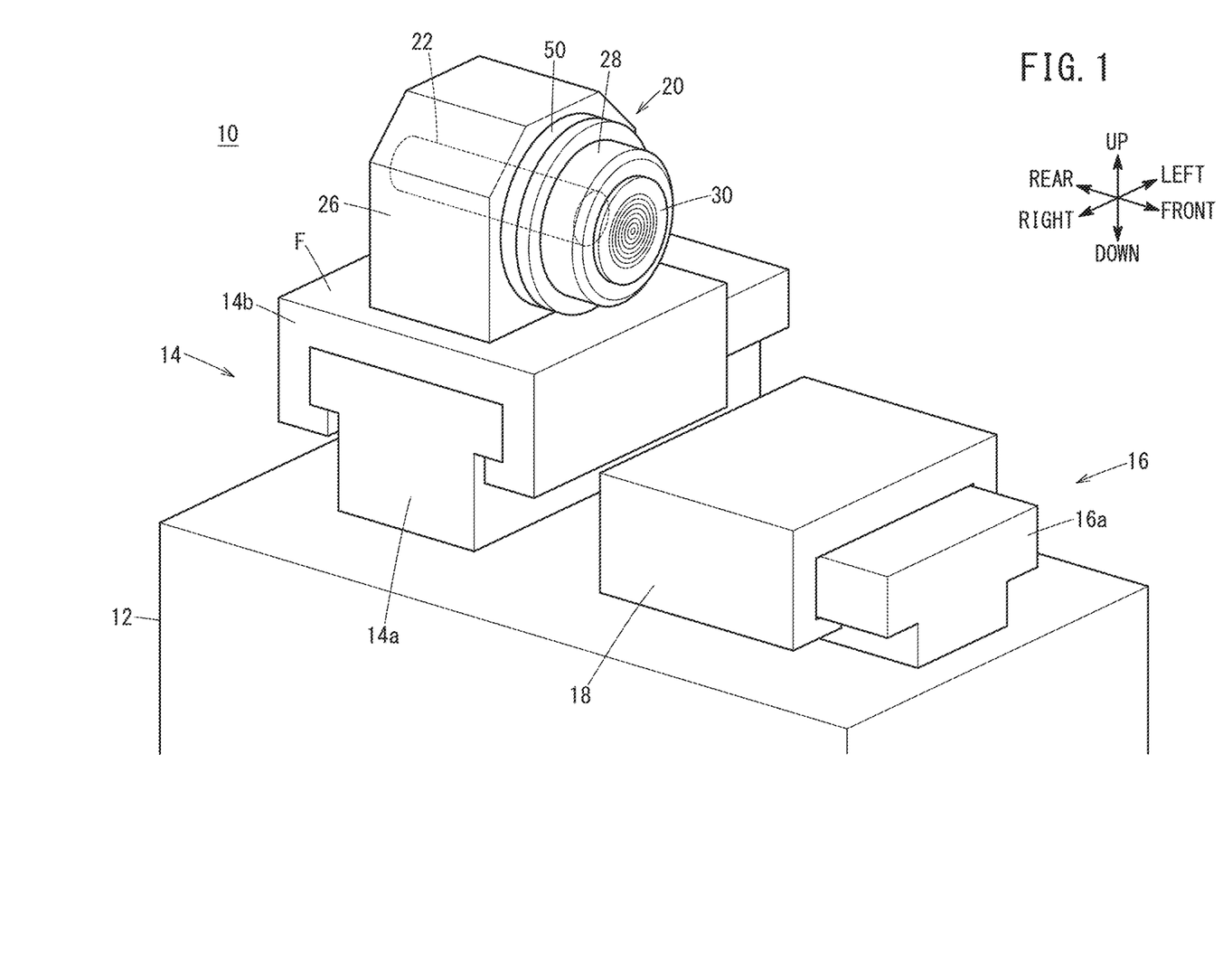
FIG. 1 is a schematic diagram showing a lathe according to the present embodiment.

FIG. 1 is a schematic view showing an appearance configuration of a lathe machine 10. The lathe machine 10 is used to machine a workpiece to be machined, using a tool, and includes a base bed 12, a spindle support 14, a table support 16, a table 18 and a spindle device 20.

The spindle support 14 is provided on the base bed 12 to support the spindle device 20 such that the spindle device can move left and right relative to the base bed 12. Here, the direction (axial direction) in which a spindle shaft 22 of the spindle device 20 extends is referred to as the front-rear direction, the direction perpendicular to the axial direction in a plane parallel to a mounting surface F on which the spindle device 20 is mounted, is referred to as the left-right direction, and the direction perpendicular to the mounting surface and the axial direction is referred to as the up-down direction. The downward direction is the direction of gravity. Further, in the spindle device 20, one end side of the spindle shaft 22 on which a chuck unit 30 is arranged is referred to as the front side, whereas the other end side of the spindle shaft 22 is referred to as the rear side.

The spindle support 14 includes a first slider 14a arranged along the left-right direction on the base bed 12, a spindle carriage 14b movable along the first slider 14a and an unillustrated first drive mechanism for driving the spindle carriage 14b.

The first drive mechanism includes a motor and components such as a ball screw that converts the rotational motion of the motor into a linear motion. As the spindle carriage 14b is moved along the first slider 14a by the first drive mechanism, the spindle device 20 on the spindle carriage 14b moves left and right relative to the base bed 12.

The table support 16 is arranged on the base bed 12 to movably support the table 18 in the front-rear direction with respect to the base bed 12. The table support 16 includes a second slider 16a provided along the front-rear direction on the base bed 12 and an unillustrated second drive mechanism for driving the table 18 that is movable along the second slider 16a.

The second drive mechanism includes a motor and components such as a ball screw that converts the rotational motion of the motor into a linear motion. The table 18 is moved in the front-rear direction relative to the base bed 12 through the second slider 16a by the second drive mechanism. The table 18 may be provided rotatably about a vertical axis as a rotation axis.

In the present embodiment, it is assumed that a workpiece is held and retained by the chuck unit 30 of the spindle device 20 while a tool is held by the table 18. However, the tool may be held by the chuck unit 30 in the spindle device 20 while the workpiece may be held and retained by the table 18.

Figure 2:
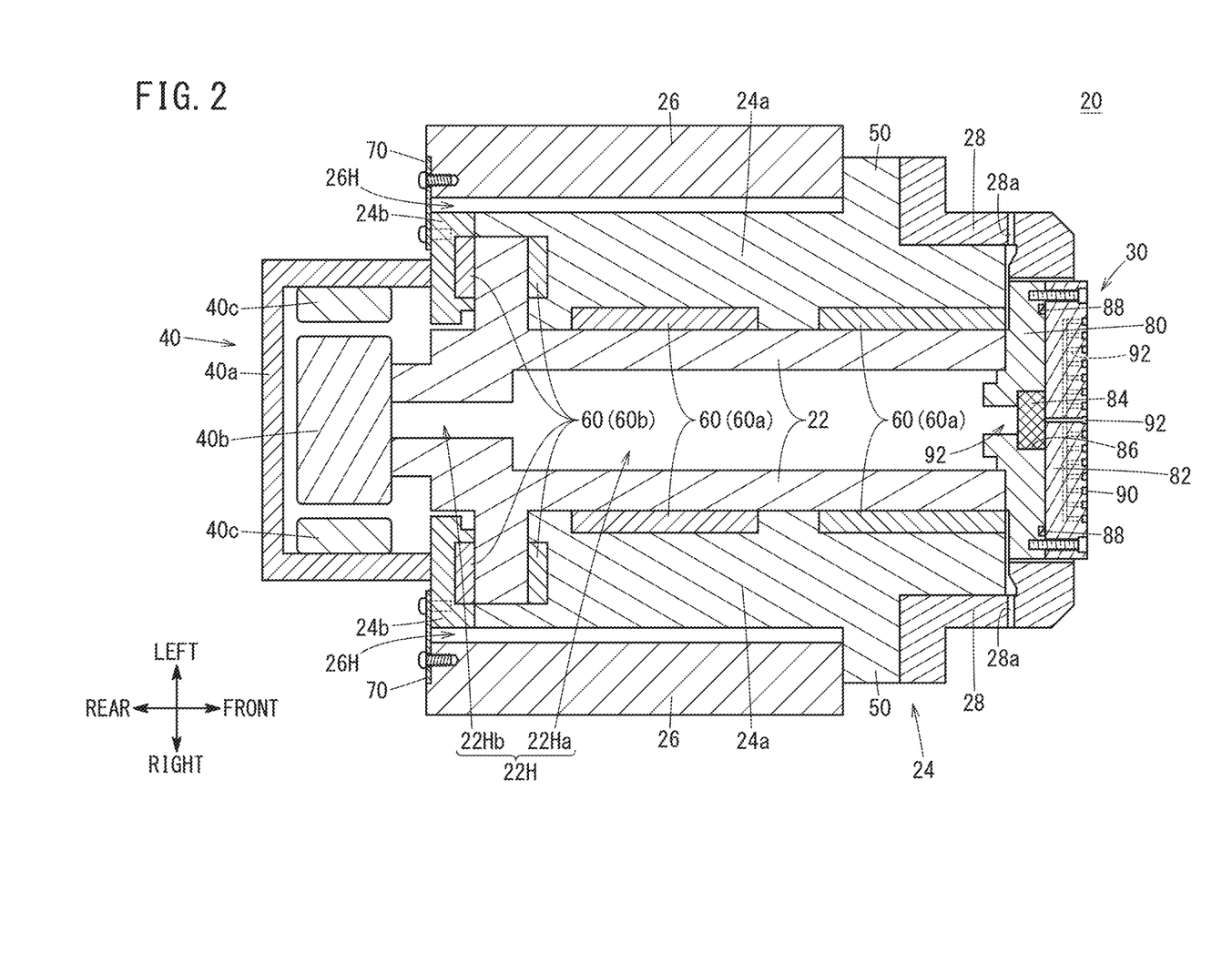
FIG. 2 is a schematic diagram showing a cross section of the spindle device of FIG. 1.

FIG. 2 is a diagram showing a cross section of the spindle device 20 of FIG. 1. The spindle device 20 of the present embodiment rotatably holds a workpiece, and is used, for example, to machine the workpiece at nanometer-scale control. The spindle device 20 contains, as main components, the spindle shaft 22, a spindle housing 24, a spindle mount 26 and a cover member 28.

The spindle shaft 22 is a cylindrical member. The spindle shaft 22 has, formed therein, a cylindrical suction passage 22H for flowing air drawn from the outside. In the example shown in FIG. 2, the suction passage 22H penetrates the spindle shaft 22 in the axial direction, and has a front side suction passage 22Ha and a rear side suction passage 22Hb having a diameter smaller than that of the front side suction passage 22Ha. The chuck unit 30 is arranged on one end side (front side) of the spindle shaft 22 and a motor 40 is provided on the other end side (rear side).

The chuck unit 30 is a rotating member that rotates in linkage with rotation of the spindle shaft 22 on the front side of the spindle housing 24, and is arranged at one end of the spindle shaft 22. This chuck unit 30 functions to attract and release (attach and detach) the workpiece in this embodiment. Here, in FIG. 1, although the chuck unit 30 is formed in a disk shape, it may have another shape.

The motor 40 is a drive source for the spindle shaft 22, and includes a motor case 40a attached to the rear side of the spindle housing 24, and a rotor 40b and a stator 40c provided inside the motor case 40a. The spindle shaft 22 is fixed to the rotor 40b. Therefore, the spindle shaft 22 rotates together with the rotation of the rotor 40b.

The spindle housing 24 has a substantially cylindrical housing body 24a and a rear housing lid 24b. The housing body 24a has, provided thereon, an annular flange portion 50 projecting outward from the outer peripheral surface of the housing body 24a. The flange portion 50 may be formed integrally with the housing body 24a, or may be formed as a separate body from the housing body 24a and fixed to the housing body 24a by predetermined fasteners.

The rear housing lid 24b is detachably attached to the rear side of the housing body 24a so as to cover the rear opening of the housing body 24a. The motor case 40a of the motor 40 is fixed to the outer (rear end face) side of the rear housing lid 24b.

A substantially cylindrical space for shaft arrangement (shaft arrangement space) is defined by the rear housing lid 24b and the housing body 24a so as to extend in the front-rear direction. The spindle shaft 22 is arranged in the shaft arrangement space, and the spindle shaft 22 arranged in the shaft arrangement space is rotatably supported by bearings 60.

The bearings 60 include radial bearings 60a and thrust bearings 60b in this embodiment. The thrust bearings 60b are arranged on the left and right sides of the spindle shaft 22. The radial bearings 60a are arranged at the front and rear of a portion of the spindle shaft 22 that is located on the front side of the thrust bearings 60b. Herein, the bearing 60 may be either a hydrostatic bearing or a rolling bearing. In the case where machining on the workpiece should be controlled on a nanometer-scale as mentioned above, use of a hydrostatic bearing is preferable.

The spindle mount 26 is placed on the mounting surface F (FIG. 1) of the spindle carriage 14b. The spindle mount 26 has an insertion cavity 26H into which the spindle housing 24 is inserted along the axial direction of the spindle shaft 22. The front side of the spindle housing 24 inserted into the insertion cavity 26H is fixed to the front side of the spindle mount 26 by the flange portion 50 provided on the housing body 24a, and the rear side of the spindle housing 24 is supported by a support member 70 provided on the rear side of the spindle mount 26.

Specifically, the flange portion 50 is detachably fixed to the front side (one open side of the insertion cavity 26H) of the spindle mount 26 by rod-shaped fasteners such as bolts. On the other hand, the support member 70 is fixed to the rear side (the other open side of the insertion cavity 26H) in the spindle mount 26 and supports the spindle housing 24. That is, the spindle housing 24 is supported on the spindle mount 26 at two ends, i.e., at front and rear of the spindle housing 24.

The cover member 28 is provided to cover the front side surface of the flange portion 50, the outer peripheral surface of the housing body 24a extending forward from the flange surface and part of the outer peripheral surface of the chuck unit 30. Although the cover member 28 covers part of the outer peripheral surface of the chuck unit 30, it may be arranged so as to cover either the whole of the outer peripheral surface or at least a part of the outer peripheral surface of the chuck unit 30.

The cover member 28 has, formed therein, a gas flow passage 28a for flowing a seal gas on order to seal a seal portion to be sealed (also simply referred to as a sealed portion). The sealed portion is a gap or a clearance between the chuck unit 30 and the cover member 28 and a gap or a clearance between the chuck unit 30 and the housing body 24a. The seal gas may be compressed to a predetermined pressure. Specific examples of the seal gas include air and others. By supplying the seal gas to the sealed portion, it is possible to prevent chips generated during machining of the workpiece, coolant used at the time of machining, etc., from entering the interior (shaft arrangement space) of the spindle housing 24 through the gap. The seal gas having flowed into the sealed portion is discharged to the outside from the front side of the spindle device 20 and others.

Further, an unillustrated coolant flow passage for flowing the coolant is formed in the cover member 28, so that the coolant flowing through the coolant flow passage adjusts the temperature of the cover member 28. The coolant is, for example, water, compressed air, or the like.

Figure 3:
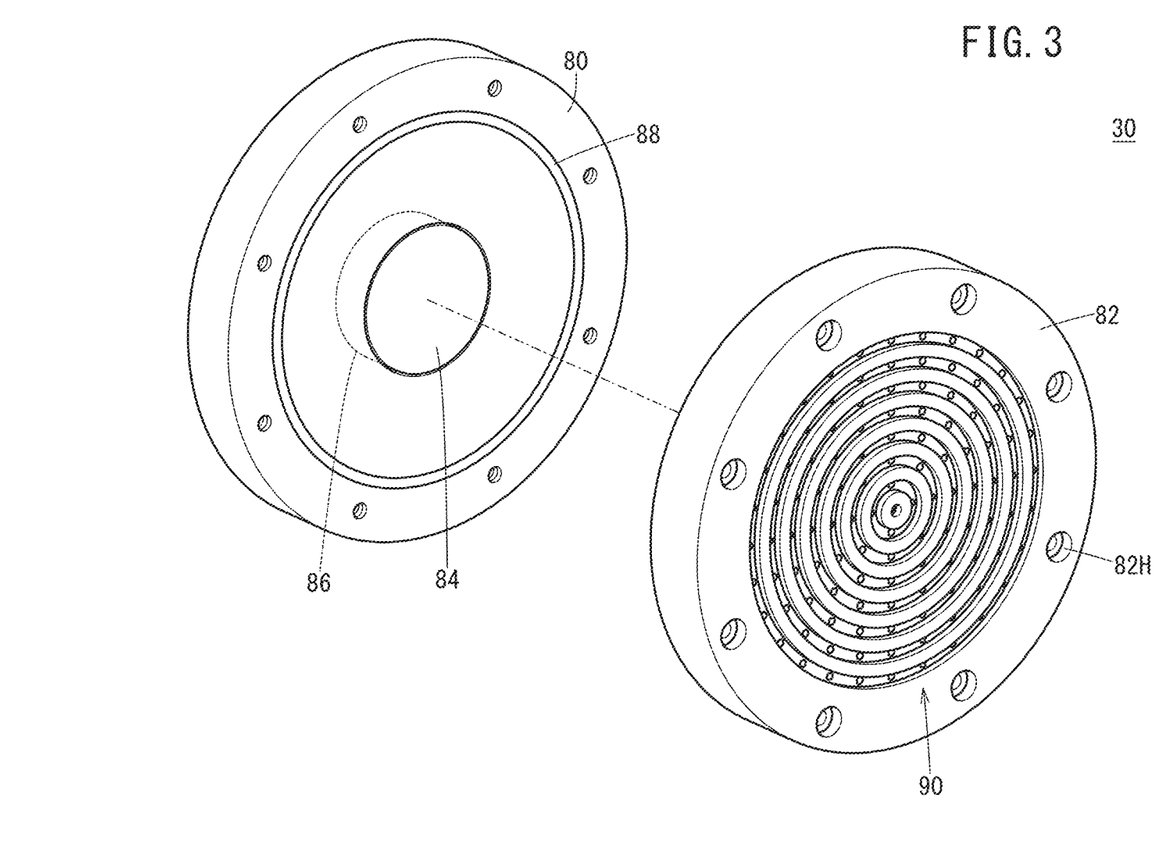
FIG. 3 is a perspective view showing a chuck unit.

FIG. 3 is a perspective view showing the chuck unit 30. The chuck unit 30 can be divided into a base portion 80 and an attaching portion 82 that is detachably attached to the base portion 80. The base portion 80 is fixed to one end of the spindle shaft 22 (see FIG. 2).

The base portion 80 has an accommodation space 86 formed in the substantially center on the front side thereof, and the accommodation space is capable of accommodating a filter 84. A sealing member 88 is attached around the accommodation space 86. That is, the accommodation space 86 and the sealing member 88 are disposed between the base portion 80 and the attaching portion 82. The filter 84 serves to remove dust contained in the air drawn from the outside, and the sealing member 88 serves to prevent air from leaking out through the gap between the base portion 80 and the attaching portion 82. The filter 84 and the sealing member 88 are replaced with new ones as necessary at the time of maintenance, inspection and the like.

The attaching portion 82 is detachably attached on the front side of the base portion 80 (a side across the base portion from the aforementioned one end of the spindle shaft 22). That is, the attaching portion 82 has a plurality of fixing holes 82H which are formed at intervals along the outer periphery of the attaching portion 82. Rod-shaped fasteners such as bolts for fixing the attaching portion 82 to the base portion 80 are inserted through the fixing holes 82H.

The attaching portion 82 is attached to the base portion 80 by inserting rod-shaped fasteners into the base portion 80 through the fixing holes 82H from the front side of the attaching portion 82. When the attaching portion 82 is attached to the base portion 80, the opening of the accommodation space 86 located between the base portion 80 and the attaching portion 82 is closed by the attaching portion 82 so that the accommodation space 86 forms a sealed space (or an enclosed space).

On the other hand, by unfastening and pulling out the rod-shaped fasteners from the base portion 80, the attaching portion 82 is detached from the base portion 80. When the attaching portion 82 is removed from the base portion 80, the opening of the accommodation space 86 located between the base portion 80 and the attaching portion 82 opens so that the accommodation space 86 is exposed. That is, the accommodation space 86 forms an open space.

The front side of the attaching portion 82 is a suctioning surface which attracts a workpiece under suction and is formed with suction ports 90 for drawing in air. The configuration of this embodiment includes a suction port 90 having a circular opening disposed at the center on the front surface, and a plurality of annular openings arranged on the front surface concentrically with the circular opening at intervals in the radial direction. The shapes and number of the suction ports 90 are not particularly limited as long as the workpiece can be attracted to the suctioning surface. However, it is preferable that multiple suction ports 90 are formed on the suctioning surface from the viewpoint of increasing the attraction of the workpiece to the suctioning surface.

Figure 4:
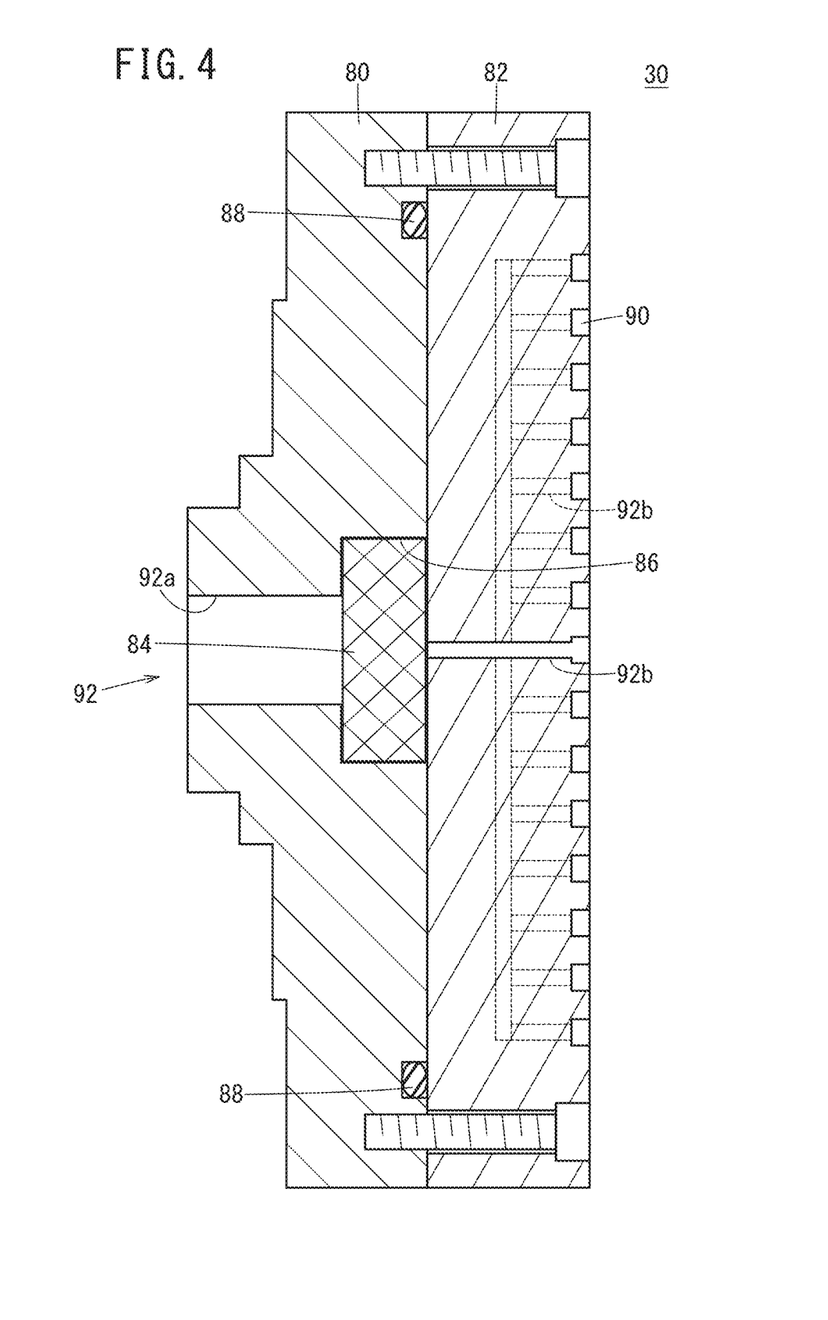
FIG. 4 is a diagram showing the chuck unit taken out from the configuration of FIG. 2.

FIG. 4 is a diagram showing the disassembled chuck unit 30 of FIG. 2. In the chuck unit 30, a communication passage 92 connecting the suction passage 22H in the spindle shaft 22 to the outside is formed, and the accommodation space 86 is arranged on the communication passage 92. That is, the accommodation space 86 is a part of the communication passage 92 that connects the suction passage 22H of the spindle shaft 22 to the outside. The communication passage 92 includes a base-side passage 92a and an attachment-side passage 92b.

The base-side passage 92a establishes communication between the suction passage 22H formed in the spindle shaft 22 and the accommodation space 86 formed in the base portion 80. In the example shown in FIG. 4, one opening of the base-side passage 92a is located at the distal end of a part of the base portion 80 that is fitted into the suction passage 22H, and the other opening of the base-side passage 92a is located in the partition wall of the base portion 80 that forms the bottom of the accommodation space 86.

The attachment-side passage 92b establishes communication between each of the multiple suction ports 90 formed on the suctioning surface of the attaching portion 82 and the accommodation space 86 formed in the base portion 80. In the example shown in FIG. 4, each suction port 90 forms the opening of the attachment-side passage 92b on one side, whereas the other opening of the attachment-side passage 92b is located on the wall surface of the attaching portion 82 facing the base portion 80, more specifically on part of the wall surface that covers the accommodation space 86 when the attaching portion is attached to the base portion 80.

When drawing in air outside the chuck unit 30, an unillustrated vacuum pump connected to the rear side of the spindle shaft 22 is driven. In this case, the air outside the chuck unit 30 is suctioned into the suction passage 22H from each suction port 90 through the attachment-side passage 92b, the accommodation space 86 and the base-side passage 92a in this order, whereby a workpiece to be machined is held in close contact on the suctioning surface of the attaching portion 82.

As described above, in the spindle device 20 of the embodiment, the chuck unit 30 can be divided into the base portion 80 fixed to the one end of the spindle shaft 22 and the attaching portion 82 detachably attached to the base portion 80. In the spindle device 20, the accommodation space 86 for the filter 84 is created between the base portion 80 and the attaching portion 82, and seal gas is supplied to the gap between the base portion 80 and the housing body 24a.

Accordingly, in the spindle device 20 of the embodiment, the attaching portion 82 can be removed from the base portion 80 so as to expose the accommodation space 86 of the filter 84 while the seal gas is being supplied to the gap between the base portion 80 and the housing body 24a. As a result, in the spindle device 20 of the present embodiment, the filter 84 can be replaced while dust is prevented from flowing into the bearings 60 and others inside the housing body 24a through the gap between the base portion 80 and the housing body 24a.

MODIFICATIONS

Though the above embodiment has been described as one example of the present invention, the technical scope of the invention should not be limited to the above embodiment. It goes without saying that various modifications and improvements can be added to the above embodiment. It is also apparent from the scope of the claims that modes added with such modifications and improvements should be incorporated in the technical scope of the invention. Examples in which the above embodiment is modified or improved will be described below.

Modification 1

Figure 5:
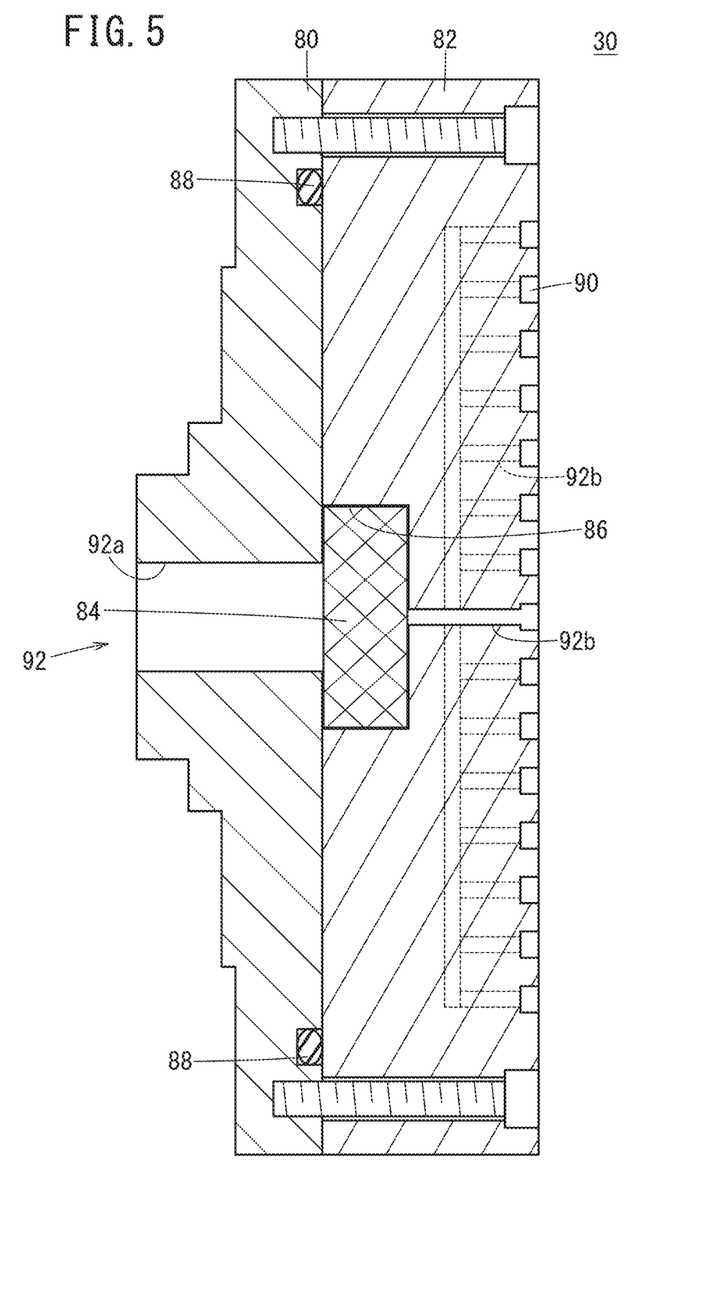
FIG. 5 is a diagram showing a chuck unit of Modification 1 from the same viewpoint as in FIG. 4.

FIG. 5 is a diagram showing a chuck unit 30 of Modification 1 from the same viewpoint as in FIG. 4. In FIG. 5, the same reference numerals are allotted to the same components as those described in the above embodiment, and the description of the components described in the above embodiment is omitted as appropriate.

In the chuck unit 30 of Modification 1, an accommodation space 86 is formed on the rear face side of the attaching portion 82. Even if the accommodation space 86 is formed in this way, the accommodation space 86 is located between the base portion 80 and the attaching portion 82, similarly to the above embodiment.

That is, when the attaching portion 82 is attached to the base portion 80, the opening of the accommodation space 86 formed in the attaching portion 82 is closed by the base portion 80 as in the above embodiment. Thus, the accommodation space 86 becomes a sealed space as in the above embodiment.

On the other hand, when the attaching portion 82 is detached from the base portion 80, the opening of the accommodation space 86 formed in the attaching portion 82 is opened and the accommodation space 86 is exposed as in the above embodiment. Thus, the accommodation space 86 becomes an open space as in the above-described embodiment.

Therefore, even in the chuck unit 30 of Modification 1, the filter 84 can be replaced while dust is prevented from flowing into the bearings 60 and others inside the housing body 24a through the gap between the base portion 80 and the housing body 24a, as in the above embodiment.

Modification 2

Figure 6:
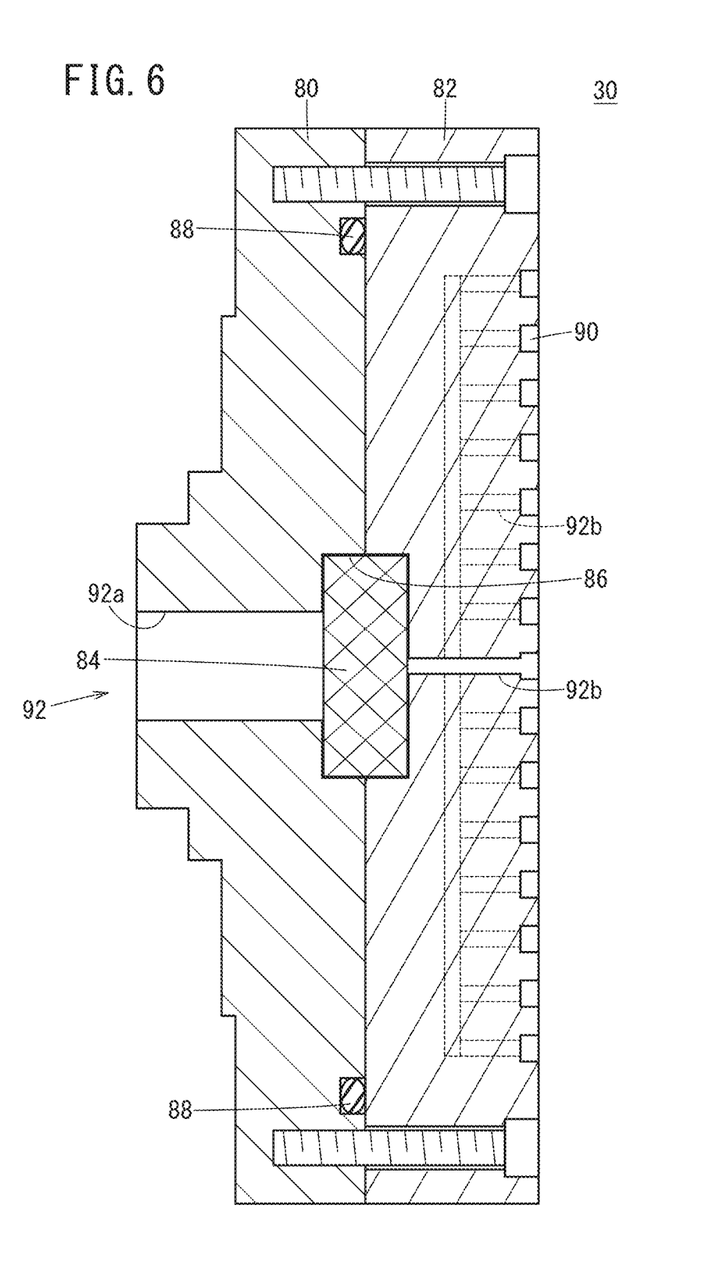
FIG. 6 is a diagram showing a chuck unit of Modification 2 from the same viewpoint as in FIG. 4.

FIG. 6 is a diagram showing a chuck unit 30 of Modification 2 from the same viewpoint as in FIG. 4. In FIG. 6, the same reference numerals are allotted to the same components as those described in the above embodiment, and the description of the components described in the above embodiment is omitted as appropriate.

In the chuck unit 30 of Modification 2, the accommodation space 86 is formed on both the front side of the base portion 80 and the rear side of the attaching portion 82. Even if the accommodation space 86 is formed in this way, the accommodation space 86 is located between the base portion 80 and the attaching portion 82, similarly to the above embodiment.

That is, when the attaching portion 82 is attached to the base portion 80, the front surface side of the base portion 80 and the rear surface side of the attaching portion 82 come into contact with each other, whereby the opening of the accommodation space 86 on the base portion 80 side and the opening of the accommodation space 86 on the attaching portion 82 side are put together and closed. As a result, the accommodation space 86 becomes a sealed space as in the above-described embodiment.

On the other hand, when the attaching portion 82 is detached from the base portion 80, the front surface side of the base portion 80 is separated from the rear surface side of the attaching portion 82, so that the opening of the accommodation space 86 on the base portion 80 side and the opening of the accommodation space 86 on the attaching portion 82 side are separated from each other and opened. As a result, as in the above embodiment, the accommodation space 86 is exposed and forms an open space.

Therefore, also in the chuck unit 30 of Modification 2, the filter 84 can be replaced while dust is prevented from flowing into the bearings 60 and others inside the housing body 24a through the gap between the base portion 80 and the housing body 24a, as in the above embodiment.

Modification 3

Figure 7:
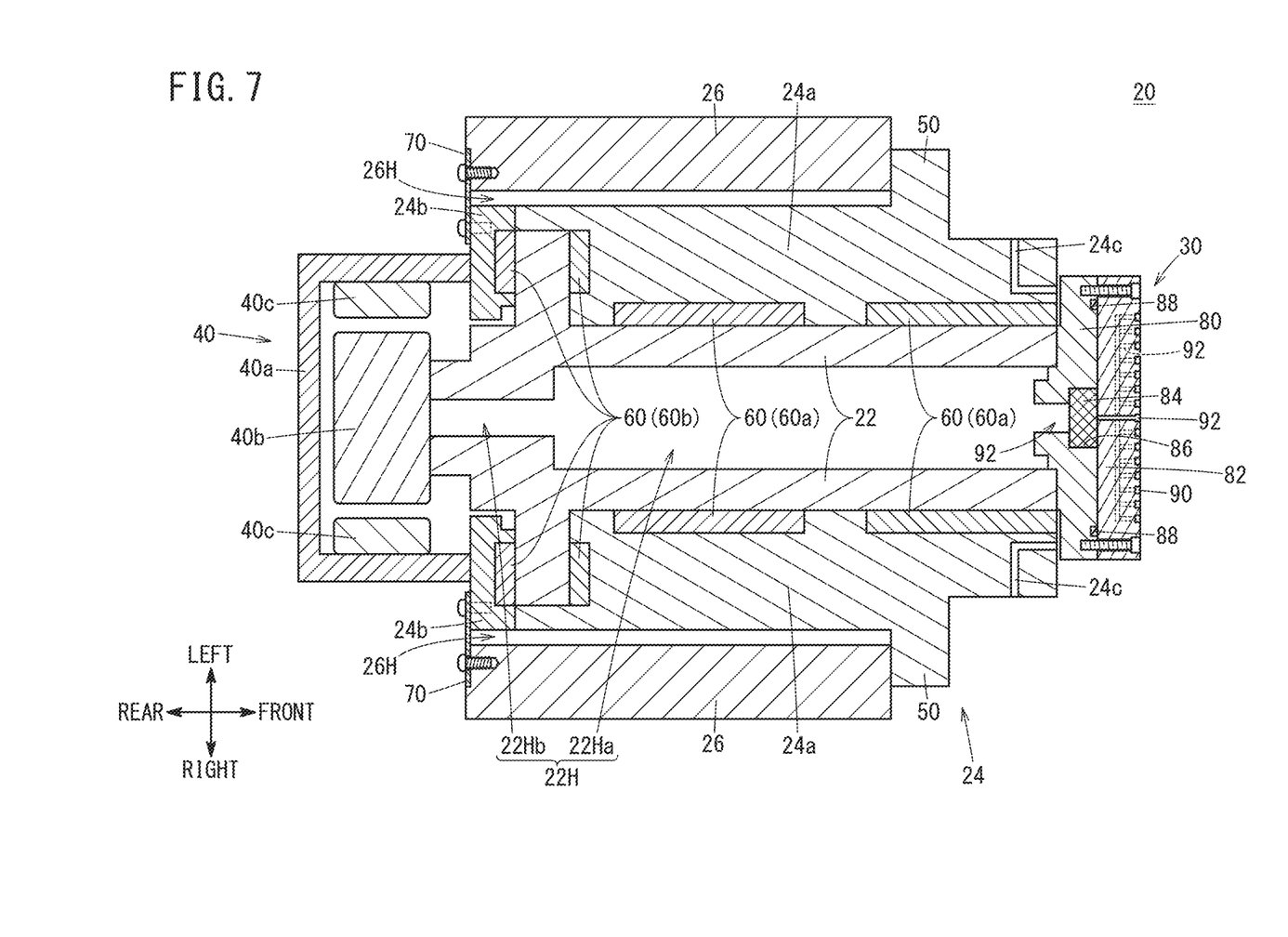
FIG. 7 is a schematic diagram showing a cross section of a spindle device of Modification 3.

FIG. 7 is a schematic diagram showing a cross section of a spindle device 20 of Modification 3. In FIG. 7, the same reference numerals are allotted to the same components as those described in the above embodiment, and the description of the components described in the above embodiment is omitted as appropriate.

In the spindle device 20 of Modification 3, the cover member 28 is not provided. Further, in the spindle device 20 of Modification 3, a gas flow passage 24c for flowing seal gas for sealing the sealed portion is formed in the housing body 24a of the spindle housing 24. This sealed portion is a gap between the rear face of the chuck unit 30 and the front face of the housing body 24a.

As described above, in the spindle device 20 of Modification 3, even if the cover member 28 is omitted, seal gas is supplied to the gap between the base portion 80 and the housing body 24a through the flow passage 24c formed in the housing body 24a.

Therefore, also in the spindle device 20 of Modification 3, the filter 84 can be replaced while dust is prevented from flowing into the bearings 60 and others inside the housing body 24a through the gap between the base portion 80 and the housing body 24a, as in the above embodiment.

Modification 4

In the above embodiment, the sealing member 88 is disposed between the base portion 80 and the attaching portion 82. However, by putting the base portion 80 and the attaching portion 82 into contact with each other, it is possible to prevent air from leaking to the outside, even without provision of the sealing member 88. Thus, the sealing member 88 is not essential.

Modification 5

The above embodiment and the above Modifications may be arbitrarily combined as long as no contradiction occurs.
[Technical Ideas]
The technical ideas that can be grasped from the above-described embodiment and Modifications will be described below.

The spindle device (20) includes a spindle housing (24), a spindle shaft (22), and a rotating member (30).

The spindle shaft (22) has, formed therein, a suction passage (22H) configured to flow air suctioned from the outside, and is rotatably supported inside the spindle housing (24).

The rotating member (30) has, formed therein, a communication passage (92) configured to establish communication between the suction passage (22H) and the outside, and is provided at one end of the spindle housing (24) so as to be rotatable in linkage with rotation of the spindle shaft (22).

The rotating member (30) includes a base portion (80) fixed to one end of the spindle shaft (22), an attaching portion (82) detachably attached to a side of the base portion (80) that is located on an opposite side of the base portion from the one end of the spindle shaft (22), and an accommodation space (86) arranged on the communication passage (92) so as to accommodate a filter (84).

According to the spindle device (20), the attaching portion (82) can be detached from the base portion (80) so as to expose the accommodation space (86) of the filter (84) while the seal gas is being supplied to the gap between the base portion (80) and the spindle housing (24). As a result, the filter (84) can be replaced while dust is prevented from flowing into the bearings (60) and others inside the spindle housing (24) through the gap between the base portion (80) and the spindle housing (24). Thus, according to the present invention, it is possible to simplify maintenance and inspection operations.

The accommodation space (86) may be disposed between the base portion (80) and the attaching portion (82).

This makes it easier to replace the filter (84), compared to the case where the filter is arranged at a place other than between the base portion (80) and the attaching portion (82).

The accommodation space (86) may be exposed when the attaching portion (82) is detached from the base portion (80).

This makes it easier to replace the filter (84), compared to the case where the filter is not exposed when the attaching portion (82) is detached from the base portion (80).

The communication passage (92) may include a base-side passage (92a) configured to establish communication between the suction passage (22H) and the accommodation space (86) and an attachment-side passage (92b) configured to establish communication between the accommodation space (86) and a plurality of suction ports (90) formed on a surface of the attaching portion (82) that is located on an opposite side of the attaching portion from the base portion (80), while the accommodation space (86) may be formed on the front side of the base portion (80).

This configuration makes it possible to provide an accommodation space (86) for the filter (84) without impairing the forming region of the attachment-side passage (92b). Therefore, it is possible to prevent reduction of the number of the multiple suction ports (90) caused by provision of the accommodation space (86).

The spindle device (20) may include a cover member (28) attached to the spindle housing (24) so as to cover the outer peripheral surface of the rotating member (30), and the cover member (28) may have, formed therein, a flow passage (28a) configured to flow seal gas into the gap from the outer peripheral side of the cover member (28).

This makes it easy to keep the outflow site of seal gas away from the spindle housing (24). Moreover, since it is not necessary to form the flow passage (24c) in the spindle housing (24), the strength of the spindle housing (24) can be easily enhanced.

The spindle housing (24) may have, formed therein, a flow passage (24c) for flowing seal gas from the outer peripheral side of the spindle housing (24) to the wall surface of the spindle housing (24) that faces the base portion (80).

This configuration makes it unnecessary to provide the cover member (28) that covers the outer peripheral surface of the rotating member (30), so that the size can be reduced accordingly.

What is claimed is:

1. A spindle device, comprising:
a spindle housing having a housing body;
a spindle shaft having, formed therein, a suction passage configured to flow air suctioned from outside, the spindle shaft being configured to be rotatably supported by a bearing provided inside the spindle housing; and
a rotating member having, formed therein, a communication passage configured to establish communication between the suction passage and the outside, the rotating member being provided at one end of the spindle shaft so as to be rotatable in linkage with rotation of the spindle shaft,
wherein the rotating member includes: a base portion fixed to and protruding into the one end of the spindle shaft, a sealed gap formed between the base portion and a front surface of the housing body; an attaching portion detachably attached to a side of the base portion that is located on an opposite side of the base portion from the one end of the spindle shaft; and an accommodation space arranged on the communication passage so as to accommodate a filter.

2. The spindle device according to claim 1, wherein the accommodation space is disposed between the base portion and the attaching portion.

3. The spindle device according to claim 2, wherein the accommodation space is exposed when the attaching portion is detached from the base portion.

4. The spindle device according to claim 1, wherein:
the communication passage includes: a base-side passage configured to establish communication between the suction passage and the accommodation space; and an attachment-side passage configured to establish communication between the accommodation space and a plurality of suction ports formed on a surface of the attaching portion that is located on an opposite side of the attaching portion from the base portion; and
the accommodation space is formed on a front side of the base portion.

* * * * *